(12) United States Patent
Saini et al.

(10) Patent No.: US 11,341,373 B1
(45) Date of Patent: May 24, 2022

(54) END-TO-END TRAINING OF A MACHINE LEARNING NODE THAT INTERFACES WITH A FIXED FUNCTION NODE

(71) Applicant: Apple Inc., Cupertino, CA (US)

(72) Inventors: Amritpal Singh Saini, San Jose, CA (US); Adrian Peter Lindberg, San Jose, CA (US); Eshan Verma, Mountain View, CA (US); Pedro Manuel Da Silva Quelhas, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 75 days.

(21) Appl. No.: 16/777,310

(22) Filed: Jan. 30, 2020

Related U.S. Application Data (60) Provisional application No. 62/816,544, filed on Mar. 11, 2019.

(51) Int. Cl.
*G06N 3/08* (2006.01)
*G06K 9/62* (2022.01)
*G06N 3/04* (2006.01)

(52) U.S. Cl.
CPC ......... *G06K 9/6262* (2013.01); *G06N 3/0445* (2013.01); *G06N 3/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 2017/0272651 | A1* | 9/2017 | Mathy | H04N 13/257 |
| 2019/0220742 | A1* | 7/2019 | Kuo | G06N 3/0481 |
| 2020/0211231 | A1* | 7/2020 | Brownlee | G06T 9/40 |
| 2020/0293013 | A1* | 9/2020 | Claussen | G06N 20/00 |

OTHER PUBLICATIONS

Matthew D. Zeiler et al., "Visualizing and Understanding Convolutional Networks", European Conference on Computer Vision, Spring, Cham, 2014, pp. 818-833.
Jinde Shubham, "What exactly does CNN see?", Jul. 14, 2018, Retrieved from the Internet: https://becominghuman.ai/what-exactly-does-cnn-see-4d436d8e6e52, pp. 1-16.

* cited by examiner

*Primary Examiner* — Cindy Trandai
(74) *Attorney, Agent, or Firm* — Fernando & Partners, LLP

(57) ABSTRACT

In some implementations, a method includes: obtaining a logical representation of a fixed function node; generating, by concerted operation of the logical representation of the fixed function node and a machine learning node that interfaces with the logical representation of the fixed function node, a candidate result based on a set of image data frames; determining whether error criteria are satisfied based at least in part on a comparison between the candidate result and a predetermined result for the set of image data frames; and, in response to determining that the error criteria are satisfied, modifying at least one of: a first portion of operating parameters of the machine learning node associated with operations of the machine learning node; and a second portion of operating parameters of the machine learning node associated with interfacing operations between the machine learning node and the logical representation of the fixed function node.

23 Claims, 5 Drawing Sheets

END-TO-END TRAINING OF A MACHINE LEARNING NODE THAT INTERFACES WITH A FIXED FUNCTION NODE

CROSS-REFERENCE TO RELATED APPLICATIONS

This application claims the benefit of U.S. Provisional Patent App. No. 62/816,544, filed on Mar. 11, 2019, which is incorporated by reference in its entirety.

TECHNICAL FIELD

The present disclosure generally relates to data processing and, more specifically, to concerted data processing with a fixed function node and a machine learning node.

BACKGROUND

Machine learning can be used to solve computer vision related tasks. Nevertheless, given the resource demands when using machine learning to solve computer vision tasks, a multi-purpose programmable hardware block, such as a central processing unit (CPU) or graphical processing unit (GPU), is typically used to accomplish the computer vision related tasks. On the contrary, embedded devices typically make use of application-specific integrated circuits (ASICs) or other fixed function nodes to perform at least a portion of the computer vision related tasks due to power, space, latency, etc. limitations.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for end-to-end training of a machine learning node that interfaces with a fixed function node whereby the machine learning node parameterizes its usage of a logical representation (e.g., a software (SW) emulation) of the fixed function node. In various implementations, a device includes a non-transitory memory and one or more processors coupled with the non-transitory memory. In some implementations, a method includes: obtaining a logical representation of a fixed function node; generating, by concerted operation of the logical representation of the fixed function node and a machine learning node that interfaces with the logical representation of the fixed function node, a candidate result based on a set of image data frames from a training dataset; determining, by a training engine, whether one or more error criteria are satisfied based at least in part on a comparison between the candidate result and a predetermined result for the set of image data frames; and, in response to determining that the one or more error criteria are satisfied, modifying, by the training engine, at least one of: one or more of a first portion of operating parameters of the machine learning node that correspond to operations of the machine learning node; and one or more of a second portion of operating parameters of the machine learning node that correspond to interfacing operations between the machine learning node and the logical representation of the fixed function node.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

As mentioned above, machine learning can be used to solve computer vision related tasks. Nevertheless, given the computational demand when using machine learning to solve computer vision tasks, a multi-purpose programmable hardware block, such as a CPU or GPU, is typically used to accomplish the computer vision related tasks. On the contrary, embedded devices typically make use of ASICs or other fixed function nodes to perform at least a portion of the computer vision related tasks due to power, space, latency, etc. limitations.

The operations of fixed function nodes cannot generally be recreated by machine learning processes because the fixed function nodes are fixed in silicon. Thus, it would be advantageous for a machine learning node to parameterize its usage of a specific fixed function node in a way which may be non-intuitive to a human operator but produce a better result or consume less resources. In other words, in various implementations, the description herein provides for end-to-end training of a machine learning node that interfaces with a fixed function node whereby the machine learning node parameterizes its usage of a logical representation (e.g., software (SW) emulation) of the fixed function node.

Figure 1:
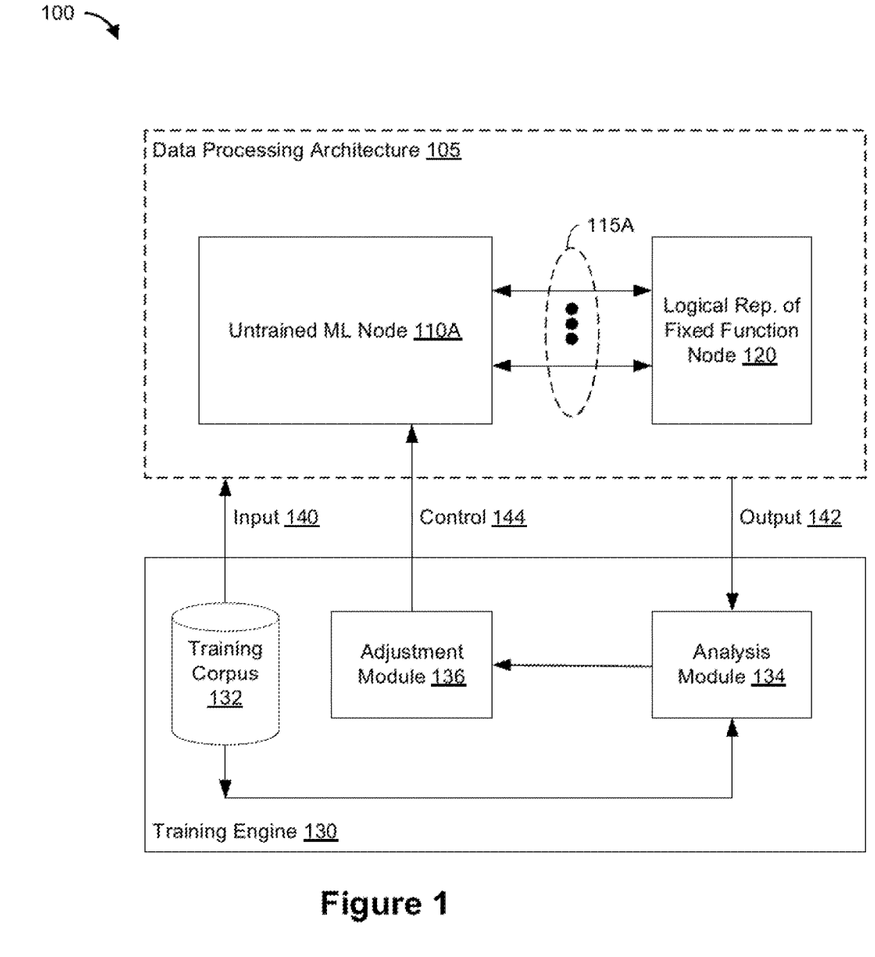
FIG. 1 is a block diagram of a training implementation of a data processing architecture in accordance with some implementations.

FIG. 1 is a block diagram of a training implementation 100 of a data processing architecture 105 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the training implementation 100 includes a data processing architecture 105 and a training engine 130. In some implementations, the data processing architecture 105 and/or the training engine 130 are included in a smartphone, tablet, laptop, wearable computing device, near-eye system, head-mounted enclosure, or the like. For example, the data processing architecture 105 and/or the training engine 130 are elements of the electronic device 500 in FIG. 5.

According to various implementations, as shown in FIG. 1, the data processing architecture 105 includes an untrained machine learning (ML) node 110A, a logical representation of a fixed function node 120, and an interface 115A between the untrained machine learning node 110A and the logical representation of a fixed function node 120. For example, the untrained machine learning node 110A corresponds to an untrained neural network, deep neural network (DNN), convolutional neural network (CNN), recurrent neural network (RNN), support vector machine (SVM), random forest algorithm, or the like.

In some implementations, the logical representation of a fixed function node 120 corresponds to a software (SW) emulation of a fixed function node. For example, the fixed function node corresponds to a fixed silicon node (or chip) such as a digital signal processing (DSP) engine, ASIC, or the like. For example, the fixed function node performs a particular task such as semantic segmentation, object segmentation, instance segmentation, color correction, white balancing, image edge aware smoothing, alpha matte extraction, another computer vision task, or the like. In some implementations, the fixed function node is differentiable. In some implementations, the fixed function node is piecewise differentiable. In some implementations, the fixed function node is reversible. In some implementations, the interface 115A corresponds to a number of inputs to the logical representation of the fixed function node 120, outputs from the logical representation of the fixed function node 120, controls associated with logical representation of the fixed function node 120, and/or the like.

According to various implementations, as shown in FIG. 1, the training engine 130 includes a training corpus 132, an analysis module 134, and an adjustment module 136. In some implementations, the training corpus 132 includes data for training the untrained machine learning node 110A such as a plurality of image data frames and known information therefor (e.g., predetermined semantic segmentation results, instance segmentation results, target image color, object alpha information, target filtered image, or the like).

In some implementations, during the training process, the data processing architecture 105 obtains an input 140 (e.g., a set of image data frames) from the training engine 130 or a component thereof (e.g., the training corpus 132). In some implementations, during the training process, an output 142 of the data processing architecture 105 (e.g., a candidate result for the set of image data frames) corresponds to a concerted operation of the logical representation of the fixed function node 120 and the untrained machine learning node 110A that interfaces with the logical representation of the fixed function node 120 via an interface 115A. For example, the output 142 corresponds to an instance segmentation result, semantic segmentation result, or the like.

In some implementations, the analysis module 134 is configured to analyze the output 142 (e.g., the candidate result for a set of image data frames) of the concerted operation of the logical representation of the fixed function node 120 and the untrained machine learning node 110A against known values associated with the input 140 from the training corpus 132 (e.g., a predetermined result for the set of image data frames). In some implementations, the analysis module 134 is also configured to determine whether one or more error criteria are satisfied based at least in part on a comparison between the candidate result and a predetermined result for the set of image data frames. For example, the one or more error criteria are satisfied if a difference between the candidate result and the predetermined result for the set of image data frames is greater than an error threshold value (e.g., a tolerance or deviation value).

In some implementations, the analysis module 134 includes a reward function that utilizes reinforcement learning to train the untrained machine learning node 110A. In some implementations, the reward function assigns a positive reward to output data 142 that is desirable and a negative reward to output data 142 that is undesirable.

In some implementations, generating the candidate result includes: generating, by the untrained machine learning node 110A, an intermediate result based on a respective image data frame among the set of image data frames; and generating, by the logical representation of the fixed function node 120, the candidate result based on the intermediate result. For example, the intermediate result corresponds to one or more feature maps for the respective image data frame, extracted features for the respective image data frame, an instance/semantic/object segmentation result for the respective image data frame, or the like. For example, the candidate result corresponds to an instance/semantic/object segmentation result for the respective image data frame, the result of another computer vision or image processing task associated with the respective image frame (e.g., object alpha, image color, filtered image, etc.), or the like In some implementations, when the analysis module 134 indicates that the one or more error criteria are satisfied, the adjustment module 136 is configured to modify, via on a control signal 144: (A) one or more of a first portion of operating parameters (e.g., neural weights) of the untrained machine learning node 110A that correspond to operations of the untrained machine learning node 110A; and (B) one or more of a second portion of operating parameters of the untrained machine learning node 110A that correspond to interfacing operations between the untrained machine learning node 110A and a logical representation of the fixed function node 120. For example, the first portion of operating parameters corresponds to weights of a neural network. For example, the second portion of operating parameters corresponds to options, controls, and/or the like for driving the fixed function node 120 and the operations thereof.

In some implementations, the analysis module 134 is configured to determine that the untrained machine learning node 110A has been trained to drive the fixed function node according to a determination that the candidate result does not satisfy the one or more error criteria associated with the predetermined result for the set of image data frame. In other words, when the difference between the candidate result and the predetermined result for the set of image data frames is less than or equal to the error tolerance threshold, the training implementation 100 is complete.

Figure 2:
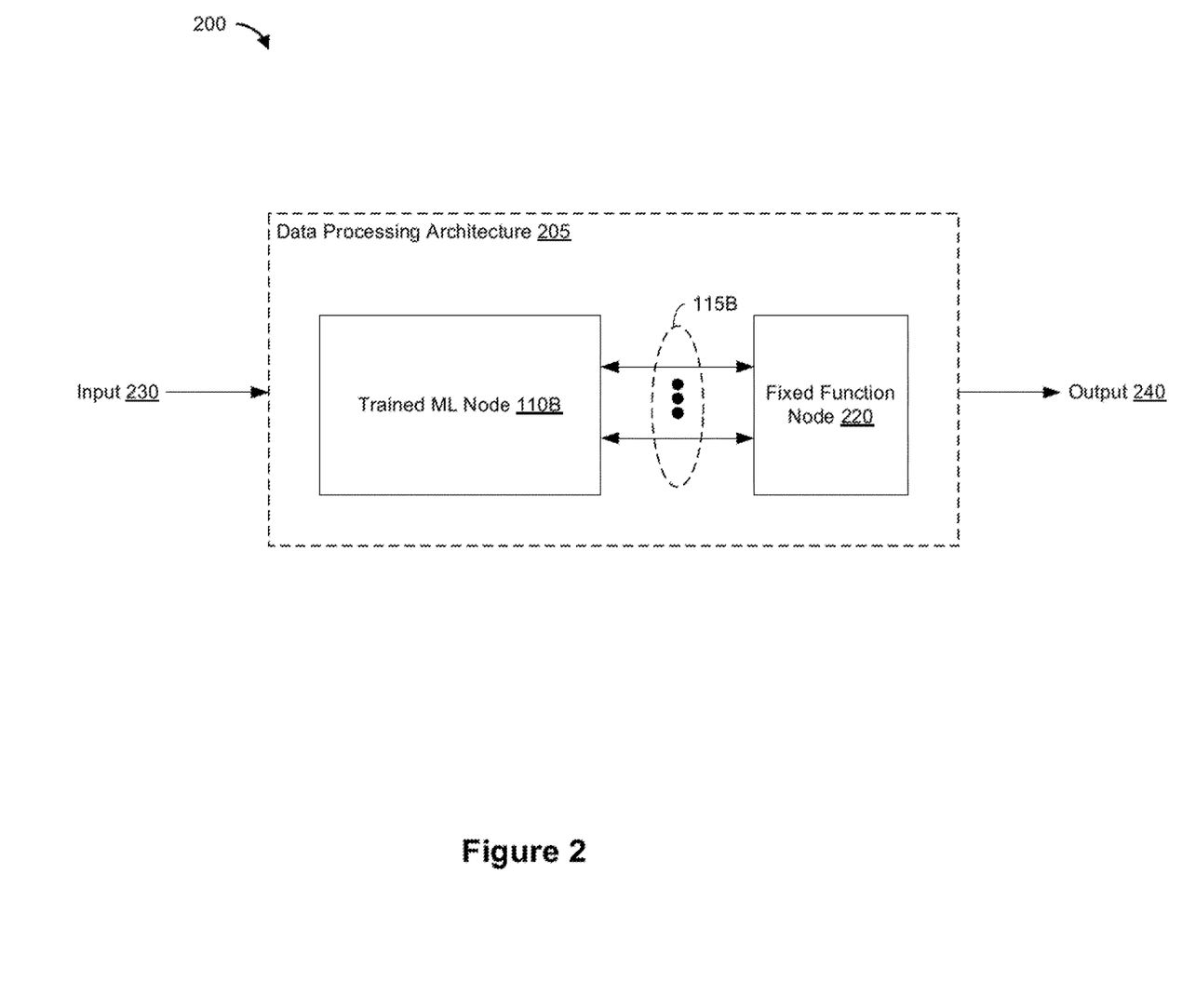
FIG. 2 is a block diagram of a run-time implementation of a data processing architecture in accordance with some implementations.

FIG. 2 is a block diagram of a run-time implementation 200 of a data processing architecture 205 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the run-time implementation 200 of the data processing architecture 205 includes a trained ML node 110B (e.g., a trained version of the untrained ML node 110A in FIG. 1) and a fixed function node 220. According to some implementations, the data processing architecture 205 is similar to and adapted from the data processing architecture 105 in FIG. 1. In some implementations, the data processing architecture 205 is included in a smartphone, tablet, laptop, wearable computing device, near-eye system, head-mounted enclosure, or the like. For example, the data processing architecture 205 is an element of the electronic device 500 in FIG. 5. In some implementations, the data processing architecture 205 corresponds to a portion of a video presentation pipeline associated with the electronic device 500 in FIG. 5.

According to various implementations, as shown in FIG. 2, the data processing architecture 205 includes the trained machine learning (ML) node 110B and the fixed function node 220, and an interface 115B between the trained machine learning node 110B and the fixed function node 220. For example, the trained machine learning node 110B corresponds to a trained version of the untrained machine learning node 110A in FIG. 1 following the training process. For example, the fixed function node 220 corresponds to a physical version of the logical representation of the fixed function node 120 in FIG. 1. For example, the interface 115B corresponds to a trained (or adjusted/modified) version of the interface 115A in FIG. 1 following the training process.

In some implementations, during run-time, the data processing architecture 205 obtains an input 230 (e.g., a set of image data frames) from a local (e.g., the one or more optional image sensors 514 of the electronic device 500) or remote source. In some implementations, during run-time, an output 240 of the data processing architecture 205 corresponds to a concerted operation of the fixed function node 220 and the trained machine learning node 110B that interfaces with the fixed function node 220 via an interface 115B.

Figure 3:
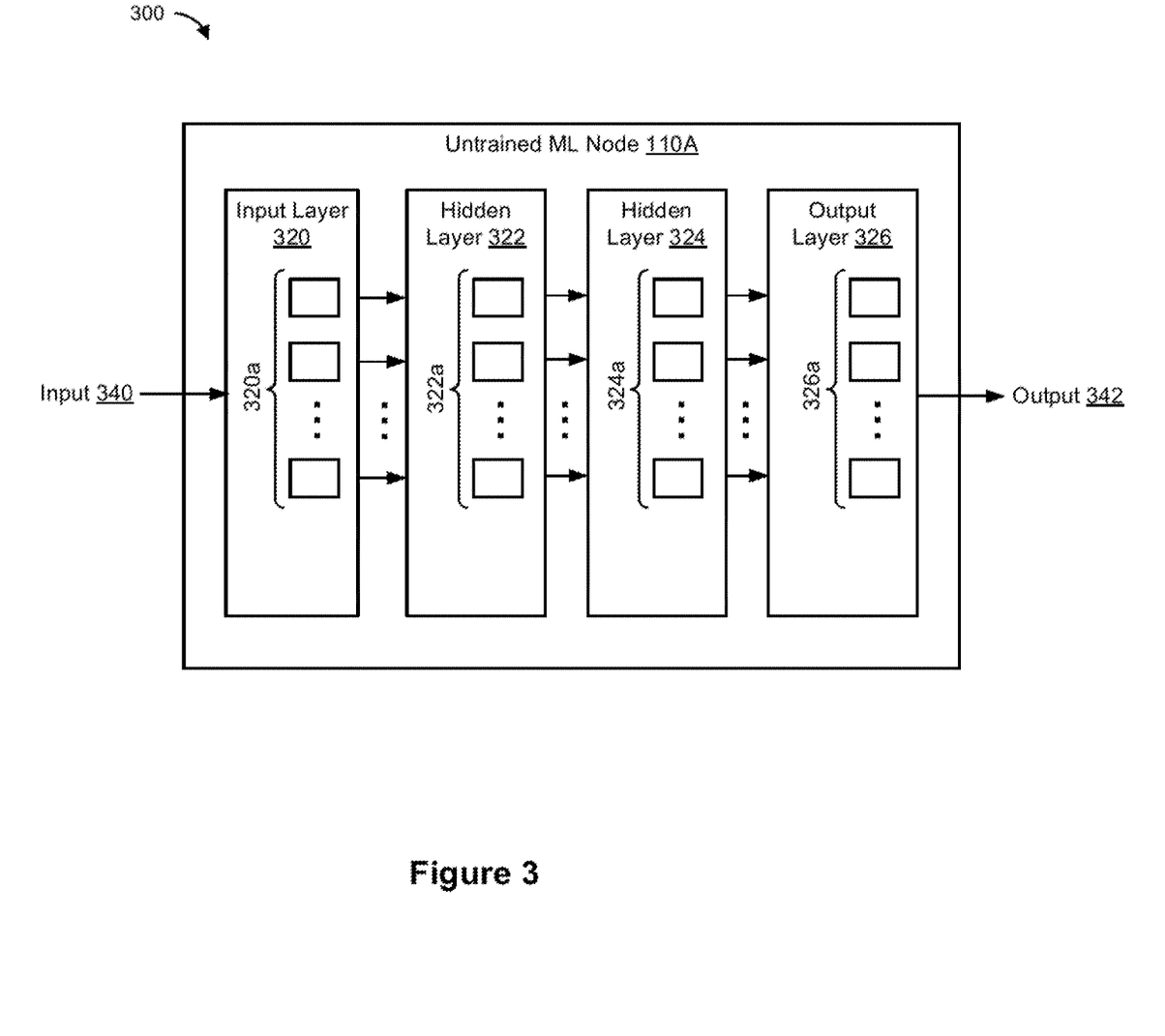
FIG. 3 is a block diagram of an example neural network implementation of an untrained machine learning node in accordance with some implementations.

FIG. 3 is a block diagram of a neural network implementation 300 of the untrained machine learning node 110A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

In the example of FIG. 3, the untrained machine learning node 110A includes an input layer 320, a first hidden layer 322, a second hidden layer 324, and an output layer 326. While the untrained machine learning node 110A includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications. Furthermore, while the untrained machine learning node 110A includes a single output layer as an example, those of ordinary skill in the art will appreciate from the present disclosure that one or more additional output layers are also present in various implementations In various implementations, the input layer 320 is coupled (e.g., configured) to receive the input data 340 (e.g., one or more image data frames from the training corpus 132 in FIG. 1, information from the logical representation of the fixed function node 120 via the interface 115A in FIG. 1, and/or the like). For example, the input layer 320 receives pixel data from one or more image sensors. In various implementations, as a non-limiting example, the input layer 320 includes a number of long short-term memory (LSTM) logic units 320a, which are also referred to as model(s) of neurons by those of ordinary skill in the art. In some such implementations, an input matrix from the features to the LSTM logic units 320a include rectangular matrices. For example, the size of this matrix is a function of the number of features included in the feature stream.

In some implementations, as a non-limiting example, the first hidden layer 322 includes a number of LSTM logic units 322a. Those of ordinary skill in the art will appreciate that, in such implementations, the number of LSTM logic units per layer is orders of magnitude smaller than previously known approaches, which allows such implementations to be embedded in highly resource-constrained devices. As illustrated in the example of FIG. 3 the first hidden layer 322 receives its inputs from the input layer 320. For example, the first hidden layer 322 performs one or more of following: a convolutional operation, a nonlinearity operation, a normalization operation, a pooling operation, and/or the like.

In some implementations, as a non-limiting example, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3, the second hidden layer 324 receives its inputs from the first hidden layer 322. Additionally and/or alternatively, in some implementations, the second hidden layer 324 receives its inputs from the input layer 320. For example, the second hidden layer 324 performs one or more of following: a convolutional operation, a nonlinearity operation, a normalization operation, a pooling operation, and/or the like.

In some implementations, as a non-limiting example, the output layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the output layer 326 is a task-dependent layer that performs a computer vision related task such as feature extraction, object recognition, object detection, pose estimation, semantic segmentation, or the like. In some implementations, the output layer 326 includes an implementation of a multinomial logistic function (e.g., a soft-max function) that produces the output data 350 (e.g., the output 142 in FIG. 1, an input to the logical representation of the fixed function node 120 in FIG. 1, and/or the like).

Neural networks, such as CNNs, are often used to solve computer vision problems including feature extraction, object recognition, object detection, pose estimation, image enhancement, image perceptual quality improvement, or the like. A modern CNN is typically described as having an input layer, a number of hidden layers, and an output layer. In at least some scenarios, the input to the input layer of the CNN is an image data frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Figure 4:
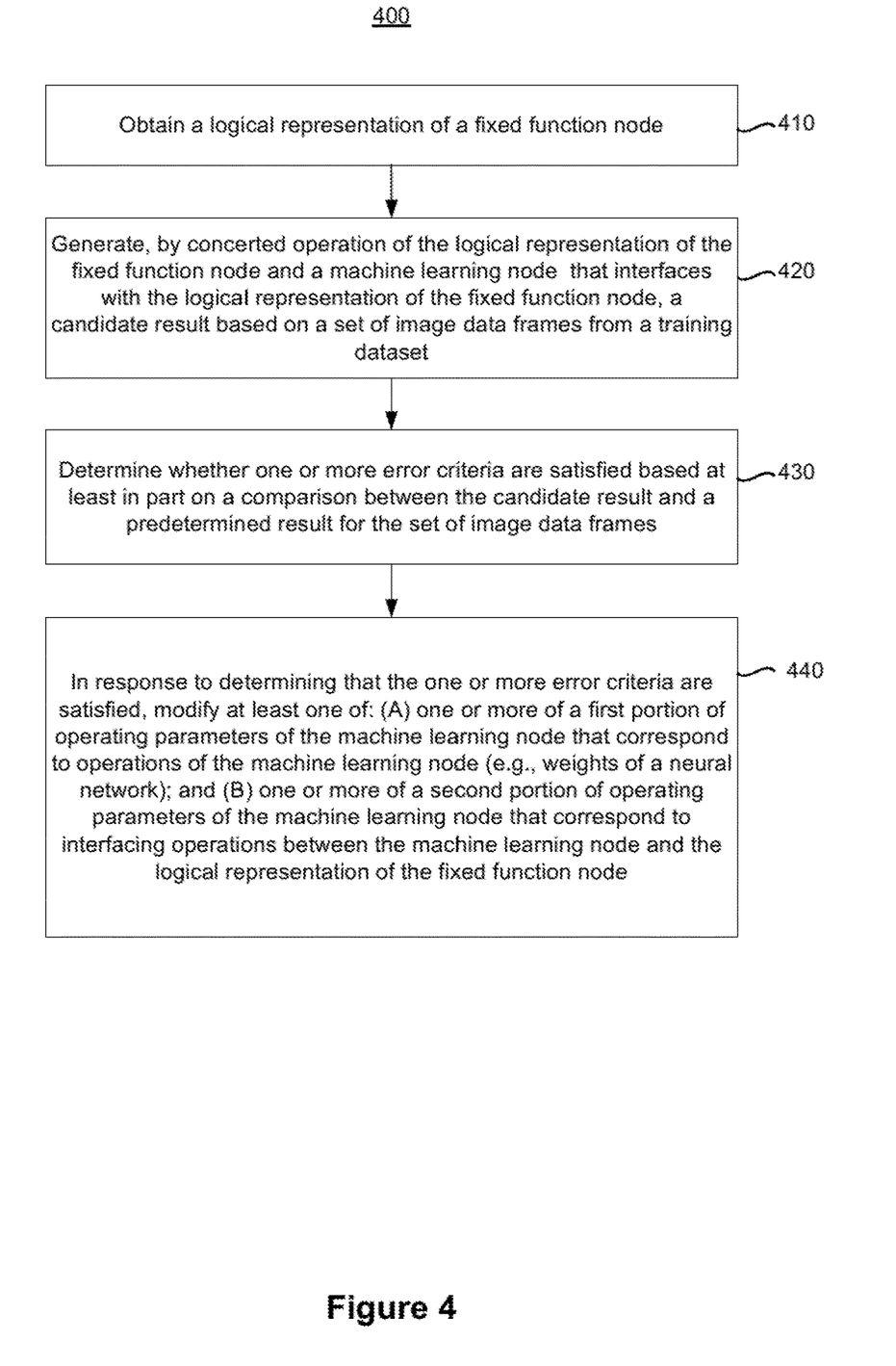
FIG. 4 is flowchart representation of a method of end-to-end training of a machine learning node that interfaces with a fixed function node whereby the machine learning node parameterizes its usage of a logical representation of the fixed function node in accordance with some implementations.

FIG. 4 is a flowchart representation of a method 400 of end-to-end training of a machine learning node that interfaces with a fixed function node whereby the machine learning node parameterizes its usage of a logical representation (e.g., an SW emulation) of the fixed function node in accordance with some implementations. In various implementations, the method 400 is performed by a device with a non-transitory memory and one or more processors coupled with the non-transitory memory (e.g., the electronic device 500 in FIG. 5). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 410, in various implementations, the method 400 includes obtaining a logical representation of a fixed function node. For example, the fixed function node corresponds to a fixed silicon node (or chip) such as a DSP engine, ASIC, or the like. In some implementations, the fixed function node performs one or more predetermined tasks or operations. For example, the fixed function node performs a particular task such as semantic segmentation, instance segmentation, another computer vision task, or the like. For example, the fixed function node corresponds to a digital-to-digital function chip that is fixed in silicon. In some implementations, the fixed function node is associated with one or more predetermined inputs or input types, one or predetermined outputs or output types, and one or more predetermined controls. In some implementations, the fixed function node is differentiable. In some implementations, the fixed function node is piecewise differentiable. In some implementations, the fixed function node is reversible.

According to various implementations, the logical representation of the fixed function node corresponds to an SW emulation of the fixed function node. In some implementations, obtaining the logical representation of the fixed function node includes retrieving the logical representation of the fixed function node from a source (e.g., a local non-transitory memory, or a remote provider such as a manufacturer or server). In some implementations, obtaining the logical representation of the fixed function node includes receiving the logical representation of the fixed function node from a source (e.g., a local non-transitory memory, or a remote provider such as a manufacturer or server). In some implementations, obtaining the logical representation of the fixed function node includes generating (or synthesizing) the logical representation of the fixed function node based on information associated with the fixed function node (e.g., predetermined inputs and outputs, predetermined controls, control semantics, schematic diagram, predetermined operations, etc.).

In some implementations, the method 400 further includes obtaining the training dataset that includes the set of image data frames. In some implementations, obtaining the training dataset includes retrieving the training dataset from a source (e.g., a local non-transitory memory, or a remote provider such as a server). In some implementations, obtaining the training dataset includes receiving the training dataset from a source (e.g., a local non-transitory memory, or a remote provider such as a server). In some implementations, obtaining the training dataset includes generating (or synthesizing) the training dataset based on seed information, seed parameters, and/or the like As represented by block 420, in various implementations, the method 400 includes generating, by concerted operation of the logical representation of the fixed function node and a machine learning node that interfaces with the logical representation of the fixed function node, a candidate result based on a set of image data frames from a training dataset. In some implementations, the machine learning node corresponds to a neural network, CNN, RNN, DNN, SVM, random forest algorithm, or the like.

In some implementations, the set of image data frames corresponds to a single image data frame. In some implementations, the set of image data frames corresponds to a plurality of image data frames. In some implementations, the candidate result for the set of image data frames corresponds to an instance segmentation result, object segmentation result, semantic segmentation result, or result of another computer vision task.

In some implementations, the machine learning node interfaces with the logical representation of the fixed function node. For example, with reference to the training implementation 100 in FIG. 1, the untrained machine learning node 110A drives the logical representation of the fixed function block using at least a portion of the interface 115A. As such, the untrained machine learning node 110A provides control signals to the logical representation of the fixed function block via the interface 115A. The untrained machine learning node 110A provides inputs to the logical representation of the fixed function block via the interface 115A. Furthermore, the untrained machine learning node 110A obtains outputs from the logical representation of the fixed function block via the interface 115A.

In some implementations, the machine learning node performs a first task, the fixed function node performs a second task, and the combination of the machine learning node and the fixed function node performs a combined task. In some implementations, generating the candidate result includes: generating, by the machine learning node, an intermediate result based on a respective image data frame from a training dataset; and generating, by the logical representation of the fixed function node, the candidate result based on the intermediate result. For example, the intermediate result corresponds to one or more feature maps for the respective image data frame, extracted features for the respective image data frame, an instance/semantic/object segmentation result for the respective image data frame, or the like. For example, the candidate result corresponds to an instance/semantic/object segmentation result for the respective image data frame, another computer vision or image processing task associated with the respective image frame, or the like As represented by block 430, in various implementations, the method 400 includes determining, by a training engine, whether one or more error criteria are satisfied based at least in part on a comparison between the candidate result and a predetermined result for the set of image data frames. In some implementations, the predetermined result for the set of image data frames corresponds to a predetermined instance segmentation result, predetermined object segmentation result, predetermined semantic segmentation result, or predetermined result of another computer vision task. In some implementations, the one or more error criteria are based on error values associated with the set of image data frames that corresponds to a comparison between candidate and predetermined results. In some implementations, the one or more error criteria are based on an aggregation of error values over a plurality of image data frames including the set of image data frames and other image data frames. In some implementations, a respective error criterion among the one or more error criteria corresponds to an error threshold value (or error tolerance value).

In some implementations, determining whether the one or more error criteria are satisfied includes determining whether an aggregation of error values satisfies the one or more error criteria, wherein the aggregation of error values includes a first error value based on the comparison between the candidate result for the set of image data frames and the predetermined result for the set of image data frames from the training dataset and a second error value based on a comparison between a previous candidate result for a previous set of image data frames and a predetermined result for the previous set of image data frames from the training dataset.

In some implementations, determining whether the one or more error criteria are satisfied includes determining whether an error value associated with the comparison between the candidate result for the set of image data frames and the predetermined result for the set of image data frames from the training dataset satisfies the one or more error criteria.

As represented by block 440, in various implementations, the method 400 includes in response to determining that the one or more error criteria are satisfied, modifying, by the training engine, at least one of: (A) one or more of a first portion of operating parameters of the machine learning node that correspond to operations of the machine learning node; and (B) one or more of a second portion of operating parameters of the machine learning node that correspond to interfacing operations between the machine learning node and the logical representation of the fixed function node. In some implementations, the machine learning node is parameterized by modifying the one or more of the first portion of operating parameters of the machine learning node. In some implementations, the machine learning node's usage of the fixed function node is parameterized by modifying one or more of the second portion of operating parameters of the machine learning node.

According to some implementations, modifying one or more of the first portion of operating parameters of the machine learning node corresponds to adjusting weights of a neural network. In some implementations, modifying one or more of the second portion of operating parameters of the machine learning node includes adjusting inputs from the machine learning node to the logical representation of the fixed function block. In some implementations, modifying one or more of the second portion of operating parameters of the machine learning node includes adjusting the manner in which the machine learning node controls or drives the logical representation of the fixed function block by modifying one or more control parameters.

In some implementations, modifying one of the first and second portions of operating parameters includes modifying one of the first and second portions of operating parameters in response to a particular candidate result generated from a single image data frame In some implementations, the method 400 further includes determining that the machine learning node has been trained to drive the fixed function node according to a determination that the candidate result does not satisfy the one or more error criteria associated with the predetermined result for the set of image data frame. In some implementations, the method 400 further includes driving the fixed function node with the trained machine learning node during run-time. As one example, in FIG. 2, the output 240 of the data processing architecture 205 corresponds to a concerted operation of the fixed function node 220 and the trained machine learning node 110B that interfaces with the fixed function node 220 via an interface 115B. With reference to the example in FIG. 2, the trained machine learning node 110B corresponds to a trained version of the untrained machine learning node 110A in FIG. 1 following the training process. With further reference to the example in FIG. 2, the interface 115B corresponds to a trained (or adjusted/modified) version of the interface 115A in FIG. 1 following the training process.

Figure 5:
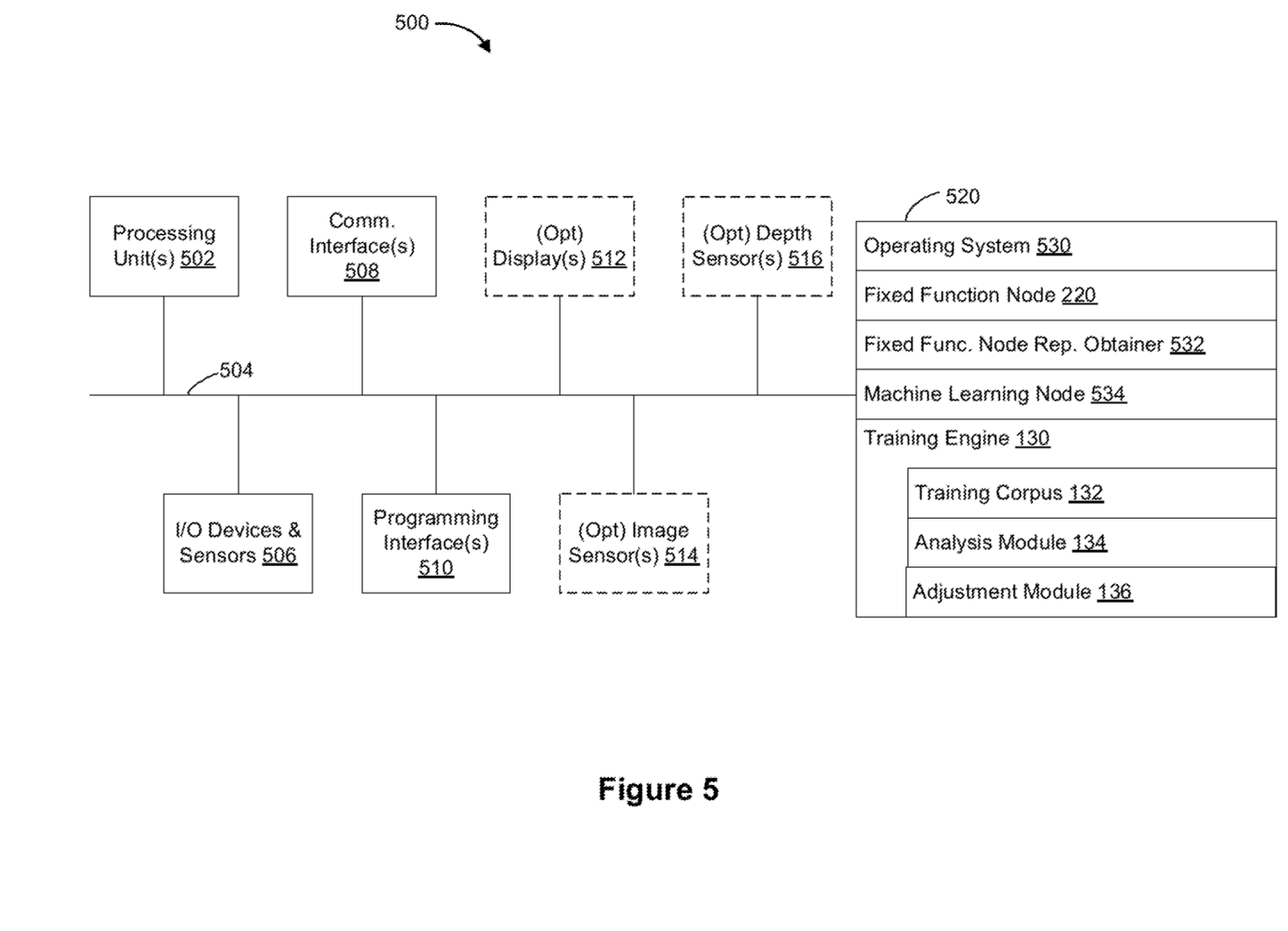
FIG. 5 is a block diagram of a device in accordance with some implementations.

FIG. 5 is a block diagram of an example of an electronic device 500 (e.g., a near-eye system, head-mounted enclosure, wearable computing device, mobile phone, tablet, laptop, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 500 includes one or more processing units 502 (e.g., microprocessors, ASICs, field-programmable gate arrays (FPGAs), graphics processing units (GPUs), central processing units (CPUs), processing cores, and/or the like), one or more input/output (I/O) devices and sensors 506, one or more communication interfaces 508 (e.g., Universal Serial Bus (USB), Institute of Electrical and Electronics Engineers (IEEE) 802.3x, IEEE 802.11x, IEEE 802.16x, Global System for Mobile communications (GSM), code-division multiple access (CDMA), time-division multiple access (TDMA), Global Positioning System (GPS), infrared (IR), BLUETOOTH, ZIGBEE, and/or the like type interface), one or more programming interfaces 510 (e.g., input/output (I/O) ports), one or more optional displays 512, one or more optional interior- and/or exterior-facing image sensors 514, one or more optional depth sensors 516, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 512 correspond to diffractive, reflective, polarized, holographic, etc. waveguide displays.

In some implementations, the one or more optional interior- and/or exterior-facing image sensors 514 are configured to obtain image data that corresponds to at least a portion of the face of the user that includes the eyes of the user. For example, the one or more optional interior- and/or exterior-facing image sensors 514 correspond to one or more RGB cameras (e.g., with a complementary metal-oxide-semiconductor (CMOS) image sensor or a charge-coupled device (CCD) image sensor), infrared (IR) image sensors, event-based cameras, and/or the like. In some implementations, the one or more optional depth sensors 516 correspond to a structured light device, a time-of-flight device, and/or the like.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530, a fixed function node representation obtainer 532, a machine learning node 534, a training engine 130, and a fixed function node 220.

The operating system 530 includes procedures for handling various basic system services and for performing hardware dependent tasks. In some implementations, the fixed function node 220 corresponds to a fixed silicon node (or chip) such as a DSP engine, ASIC, or the like. For example, the fixed function node 220 performs a particular task such as semantic segmentation, instance segmentation, another computer vision task, or the like.

In some implementations, the fixed function node representation obtainer 532 is configured to obtain (e.g., receive, retrieve, or generate) a logical representation of the fixed function node 220. To that end, in various implementations, the fixed function node representation obtainer 532 includes instructions and/or logic therefor, and heuristics and metadata therefor.

In some implementations, the machine learning node 534 is configured to perform data processing operations. According to some implementations, the machine learning node 534 corresponds to the untrained machine learning node 110A in FIG. 1 and the trained machine learning node 110B in FIG. 2. For example, the machine learning node 534 corresponds to a neural network, CNN, RNN, DNN, SVM, random forest algorithm, or the like.

In some implementations, the training engine 130 is configured to train the machine learning node 534 (e.g., the untrained machine learning node 110A in FIG. 1). For example, training the machine learning node 534 includes modifying: (A) one or more of a first portion of operating parameters of the machine learning node 534 that correspond to operations of the machine learning node 534 (e.g., neural weights); and (B) one or more of a second portion of operating parameters of the machine learning node 534 that correspond to interfacing operations between the machine learning node 534 and a logical representation of a fixed function node.

To that end, in some implementations, the training engine 130 includes: a training corpus 132, an analysis module 134, and an adjustment module 136. In some implementations, the training corpus 132 includes a plurality of images for training the machine learning node 534.

In some implementations, the analysis module 134 is configured to analyze the output of a concerted operation of a logical representation of a fixed function node and the machine learning node 534 that interfaces with the logical representation of the fixed function node against known values for the training corpus 132. In some implementations, the analysis module 134 is also configured to whether one or more error criteria are satisfied based at least in part on a comparison between the candidate result and a predetermined result for the set of image data frames. To that end, in various implementations, the analysis module 134 includes instructions and/or logic therefor, and heuristics and metadata therefor.

In some implementations, the adjustment module 136 is configured to modify: (A) one or more of a first portion of operating parameters of the machine learning node 534 that correspond to operations of the machine learning node 534 (e.g., neural weights); and (B) one or more of a second portion of operating parameters of the machine learning node 534 that correspond to interfacing operations between the machine learning node 534 and a logical representation of a fixed function node. To that end, in various implementations, the adjustment module 136 includes instructions and/or logic therefor, and heuristics and metadata therefor.

Moreover, FIG. 5 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device including one or more processors and a non-transitory memory:
      obtaining a set of image data frames from a training dataset;
      obtaining a logical representation of a fixed function node that performs one or more predetermined tasks or operations on the set of image data frames, wherein the logical representation of the fixed function node corresponds to a software emulation of the fixed function node;
      providing the set of image data frames to the logical representation of the fixed function node and to a machine learning node that interfaces with the logical representation of the fixed function node;
      generating, by concerted operation of the logical representation of the fixed function node and the machine learning node, a candidate result based on the set of image data frames;
      determining, by a training engine, whether one or more error criteria are satisfied based at least in part on a comparison between the candidate result and a predetermined result for the set of image data frames; and
      in response to determining that the one or more error criteria are satisfied, modifying, by the training engine:
         one or more of a first portion of operating parameters of the machine learning node that correspond to operations of the machine learning node; and
         one or more of a second portion of operating parameters of the machine learning node that correspond to interfacing operations between the machine learning node and the logical representation of the fixed function node.

2. The method of claim 1, wherein generating the candidate result includes:
   generating, by the machine learning node, an intermediate result based on a respective image data frame among the set of image data frames; and
   generating, by the logical representation of the fixed function node, the candidate result based on the intermediate result.

3. The method of claim 2, wherein the intermediate result corresponds to one or more feature maps for the respective image data frame.

4. The method of claim 1, further comprising:
   determining that the machine learning node has been trained to drive the fixed function node according to a determination that the candidate result does not satisfy the one or more error criteria associated with the predetermined result for the set of image data frames.

5. The method of claim 1, further comprising:
   driving the fixed function node with the trained machine learning node during run-time.

6. The method of claim 1, wherein determining whether the one or more error criteria are satisfied includes determining whether an aggregation of error values satisfies the one or more error criteria, the aggregation of error values including a first error value based on the comparison between the candidate result for the set of image data frames and the predetermined result for the set of image data frames from the training dataset and a second error value based on a comparison between a previous candidate result for a previous set of image data frames and a predetermined result for the previous set of image data frames from the training dataset.

7. The method of claim 1, wherein determining whether the one or more error criteria are satisfied includes determining whether an error value associated with the comparison between the candidate result for the set of image data frames and the predetermined result for the set of image data frames from the training dataset satisfies the one or more error criteria.

8. The method of claim 7, wherein modifying one of the first and second portions of operating parameters includes modifying one of the first and second portions of operating parameters in response to a particular candidate result generated from a single image data frame.

9. The method of claim 1, wherein the set of image data frames from the training dataset corresponds to a single image data frame.

10. The method of claim 1, wherein the set of image data frames from the training dataset corresponds to a plurality of image data frames.

11. The method of claim 1, wherein a respective error criterion among the one or more error criteria corresponds to an error threshold value.

12. The method of claim 1, wherein the machine learning node interfaces with the logical representation of the fixed function node.

13. The method of claim 1, wherein the fixed function node corresponds to a silicon digital-to-digital function node.

14. A device comprising:
one or more processors;
a non-transitory memory; and
one or more programs stored in the non-transitory memory, which, when executed by the one or more processors, cause the device to:
  obtain a set of image data frames from a training dataset;
  obtain a logical representation of a fixed function node that performs one or more predetermined tasks or operations on the set of image data frames, wherein the logical representation of the fixed function node corresponds to a software emulation of the fixed function node;
  provide the set of image data frames to the logical representation of the fixed function node and to a machine learning node that interfaces with the logical representation of the fixed function node;
  generate, by concerted operation of the logical representation of the fixed function node and the machine learning node, a candidate result based on the set of image data frames;
  determine, by a training engine, whether one or more error criteria are satisfied based at least in part on a comparison between the candidate result and a predetermined result for the set of image data frames; and
  in response to determining that the one or more error criteria are satisfied, modify, by the training engine:
    one or more of a first portion of operating parameters of the machine learning node that correspond to operations of the machine learning node; and
    one or more of a second portion of operating parameters of the machine learning node that correspond to interfacing operations between the machine learning node and the logical representation of the fixed function node.

15. The device of claim 14, wherein the one or more programs further cause the device to:
drive the fixed function node with the trained machine learning node during run-time.

16. The device of claim 14, wherein determining whether the one or more error criteria are satisfied includes determining whether an aggregation of error values satisfies the one or more error criteria, the aggregation of error values including a first error value based on the comparison between the candidate result for the set of image data frames and the predetermined result for the set of image data frames from the training dataset and a second error value based on a comparison between a previous candidate result for a previous set of image data frames and a predetermined result for the previous set of image data frames from the training dataset.

17. The device of claim 14, wherein determining whether the one or more error criteria are satisfied includes determining whether an error value associated with the comparison between the candidate result for the set of image data frames and the predetermined result for the set of image data frames from the training dataset satisfies the one or more error criteria.

18. The device of claim 17, wherein modifying one of the first and second portions of operating parameters includes modifying one of the first and second portions of operating parameters in response to a particular candidate result generated from a single image data frame.

19. A non-transitory memory storing one or more programs, which, when executed by one or more processors of a device, cause the device to:
obtain a set of image data frames from a training dataset,
obtain a logical representation of a fixed function node that performs one or more predetermined tasks or operations on the set of image data frames, wherein the logical representation of the fixed function node corresponds to a software emulation of the fixed function node;
provide the set of image data frames to the logical representation of the fixed function node and to a machine learning node that interfaces with the logical representation of the fixed function node;
generate, by concerted operation of the logical representation of the fixed function node and the machine learning node, a candidate result based on the set of image data frames;
determine, by a training engine, whether one or more error criteria are satisfied based at least in part on a comparison between the candidate result and a predetermined result for the set of image data frames; and
in response to determining that the one or more error criteria are satisfied, modify, by the training engine:
  one or more of a first portion of operating parameters of the machine learning node that correspond to operations of the machine learning node; and
  one or more of a second portion of operating parameters of the machine learning node that correspond to interfacing operations between the machine learning node and the logical representation of the fixed function node.

20. The non-transitory memory of claim 19, wherein the one or more programs further cause the device to:
drive the fixed function node with the trained machine learning node during run-time.

21. The non-transitory memory of claim 19, wherein determining whether the one or more error criteria are satisfied includes determining whether an aggregation of error values satisfies the one or more error criteria, the aggregation of error values including a first error value based on the comparison between the candidate result for the set of image data frames and the predetermined result for the set of image data frames from the training dataset and a second error value based on a comparison between a previous candidate result for a previous set of image data frames and a predetermined result for the previous set of image data frames from the training dataset.

22. The non-transitory memory of claim 19, wherein determining whether the one or more error criteria are satisfied includes determining whether an error value associated with the comparison between the candidate result for the set of image data frames and the predetermined result for the set of image data frames from the training dataset satisfies the one or more error criteria.

23. The non-transitory memory of claim 22, wherein modifying one of the first and second portions of operating parameters includes modifying one of the first and second portions of operating parameters in response to a particular candidate result generated from a single image data frame.

* * * * *